J. McCARTY.
THILL SUPPORTS.
No. 177,862.    Patented May 23, 1876.
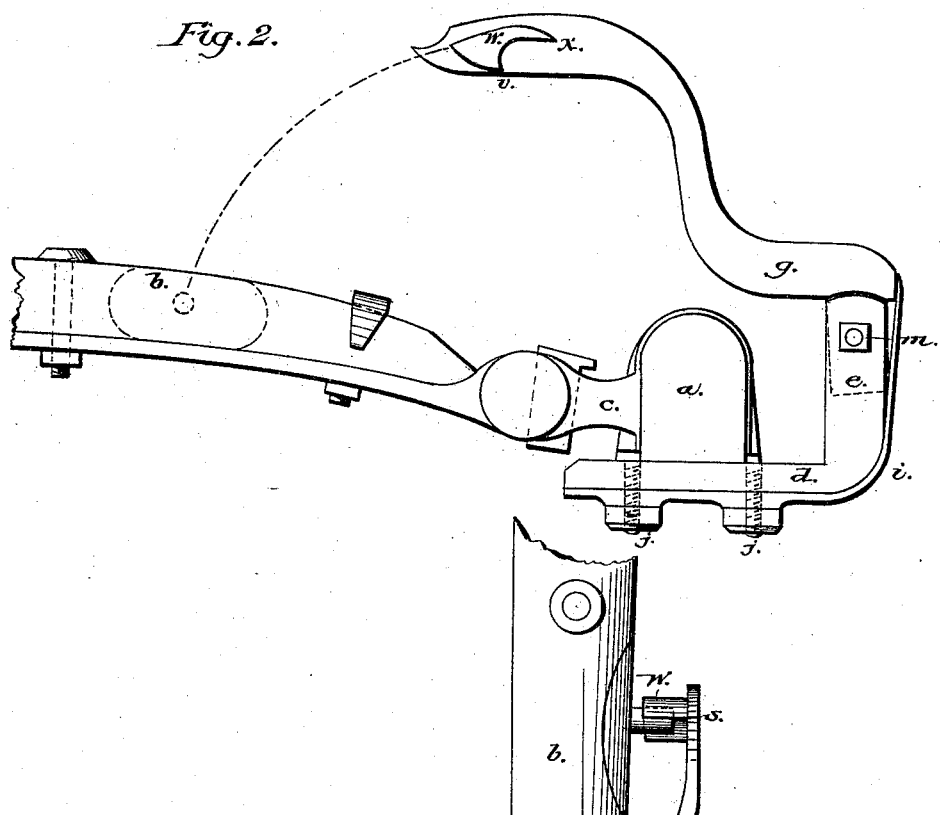
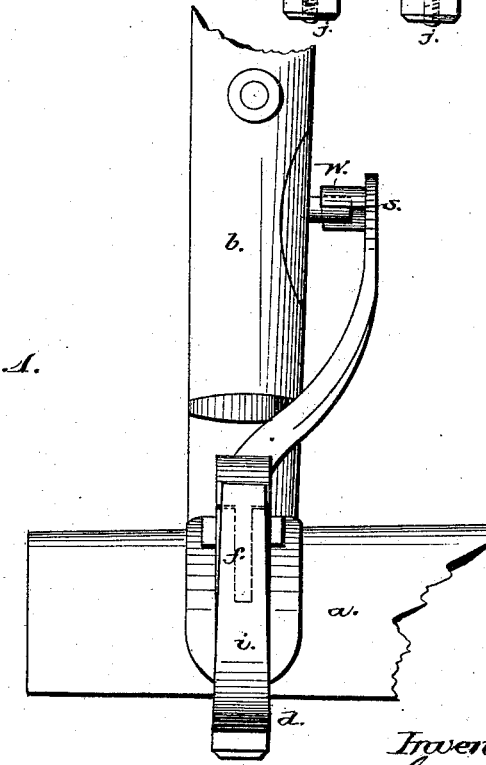
Witnesses:          Inventor:

UNITED STATES PATENT OFFICE.

JOSEPH McCARTY, OF FRANKLIN, OHIO.

IMPROVEMENT IN THILL-SUPPORTS.

Specification forming part of Letters Patent No. 177,862, dated May 23, 1876; application filed October 25, 1875.

*To all whom it may concern:*

Be it known that I, JOSEPH MCCARTY, of Franklin, Warren county, Ohio, have invented a new and useful Improvement in Shaft-Holders for Carriages; and I do hereby declare that the following is a full, clear, and exact description thereof, reference being had to the accompanying drawings, and to the letters of reference marked thereon.

Figure 1 represents a rear elevation of my improvement connected with the axle of a carriage. Fig. 2 is a side elevation of the same.

The object of my invention is to provide a holder for supporting carriage-shafts while the horse is being attached to the vehicle, and which holder may be readily attached and detached to and from the shafts by simply raising the shafts upon their hinges or shackle-joints, as hereinafter more fully described.

In the drawings, $a$ denotes the front axle of a buggy or carriage, to which the shaft $b$ is connected by shackle-joint $c$. The clip-bar $d$ of the shackle-iron extends rearward and upward, as represented by the part $e$, which is made in two branches or jaws to receive the tongue $f$, (which is a part of arm $g$,) represented in dotted lines, and form a joint, connecting the catch-arm $g$ with the part $e$ by the hinge-bolt $m$. The flat bent spring $i$, secured by the bolts and nuts $j\ j$, which fasten the shackle-iron around the axle, extends rearward and upward against the rear side of the part $e$ of the clip-bar, to act against the tongue $f$ of the hinge-joint, as represented. The arm $g$, which is thus hinged to the clip-bar is curved laterally and vertically, so as to cause its upper end to extend past the shaft when the latter is raised up. To the side of the shaft $b$ a short stud, $s$, is secured, and to the side of the bent hinged arm $g$ the catch $w$ is fastened rigidly.

In using this improvement a person when about to attach a horse to the carriage, will raise up the shafts $b$ until the stud $s$, acting against the lower ledge or surface of catch $w$, raises arm $g$, held by spring $i$, and passed behind the point $v$ into the recess or hook of catch $w$, which will hold the shafts in an elevated position. When the horse is placed in proper position to lower the shafts, the latter will be again raised up sufficiently to cause stud $s$ to pass behind the point $x$, when spring $i$ will act upon tongue $f$ of arm $g$, and cause it to move downward, when the stud $s$ will (when the shafts are being let down,) pass over the catch $w$. By this improvement the shafts are caught and held, and also released by raising them up upon their hinged connections.

Having described my improvement in carriage-shaft holders, I claim—

The jointed arm $g$, provided with the catch $w$, and held by spring $i$, in combination with the stud $s$ on shaft $b$, substantially as and for the purpose specified.

Witness my hand this 20th day of September, A. D. 1875.

JOSEPH McCARTY.

Witnesses:
 M. DECHAUT,
 FRANK EMLEY.